United States Patent
Prasanna et al.

(10) Patent No.: US 8,694,951 B1
(45) Date of Patent: Apr. 8, 2014

(54) CORE WRAPPING IN THE PRESENCE OF AN EMBEDDED WRAPPED CORE

(71) Applicant: LSI Corporation, Milpitas, CA (US)

(72) Inventors: Narendra B. Devta Prasanna, San Jose, CA (US); Saket K. Goyal, San Ramon, CA (US); Vankat Rajesh Atluri, Bangalore (IN)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/633,334

(22) Filed: Oct. 2, 2012

(51) Int. Cl.
*G06F 11/22* (2006.01)
*G06F 17/50* (2006.01)

(52) U.S. Cl.
USPC ........... 716/136; 714/726; 714/727; 714/728; 714/729

(58) Field of Classification Search
USPC .................................. 716/136; 714/726–729
See application file for complete search history.

(56) References Cited

U.S. PATENT DOCUMENTS

| | | | |
|---|---|---|---|
| 6,751,768 B2 | 6/2004 | Muradali et al. | 714/738 |
| 7,188,330 B2 | 3/2007 | Goyal | 716/18 |
| 7,725,784 B2 | 5/2010 | Laouamri et al. | 714/724 |
| 7,913,135 B2* | 3/2011 | Whetsel | 714/727 |
| 2003/0131327 A1* | 7/2003 | Dervisoglu et al. | 716/4 |
| 2003/0163773 A1* | 8/2003 | O'Brien et al. | 714/726 |
| 2006/0190784 A1* | 8/2006 | Gillis et al. | 714/726 |
| 2007/0288797 A1* | 12/2007 | Chakravarthy et al. | 714/30 |
| 2008/0104466 A1* | 5/2008 | Menon et al. | 714/727 |
| 2008/0104467 A1* | 5/2008 | Satsukawa | 714/729 |
| 2008/0270858 A1* | 10/2008 | Priel et al. | 714/727 |
| 2011/0016364 A1* | 1/2011 | Varadarajan et al. | 714/726 |
| 2011/0314514 A1* | 12/2011 | Goyal et al. | 726/2 |
| 2013/0024737 A1* | 1/2013 | Marinissen et al. | 714/727 |
| 2013/0047046 A1* | 2/2013 | Goel | 714/727 |

OTHER PUBLICATIONS

DaSilva, Francisco, et al., "Overview of the IEEE P1500 Standard", ITC International Test Conference, 2003, pp. 988-997.

* cited by examiner

*Primary Examiner* — Nha Nguyen
(74) *Attorney, Agent, or Firm* — Christopher P. Maiorana, PC

(57) ABSTRACT

An apparatus having a core and one or more logic blocks is disclosed. The core may be embedded within the apparatus. The core is generally (i) configured to perform a function and (ii) wrapped internally by a first scan chain before being embedded within the apparatus. The logic blocks may be (i) positioned external to the core and (ii) coupled to one or more parallel interfaces of the first scan chain. A second scan chain may be configured to wrap both the logic blocks and the core.

18 Claims, 13 Drawing Sheets

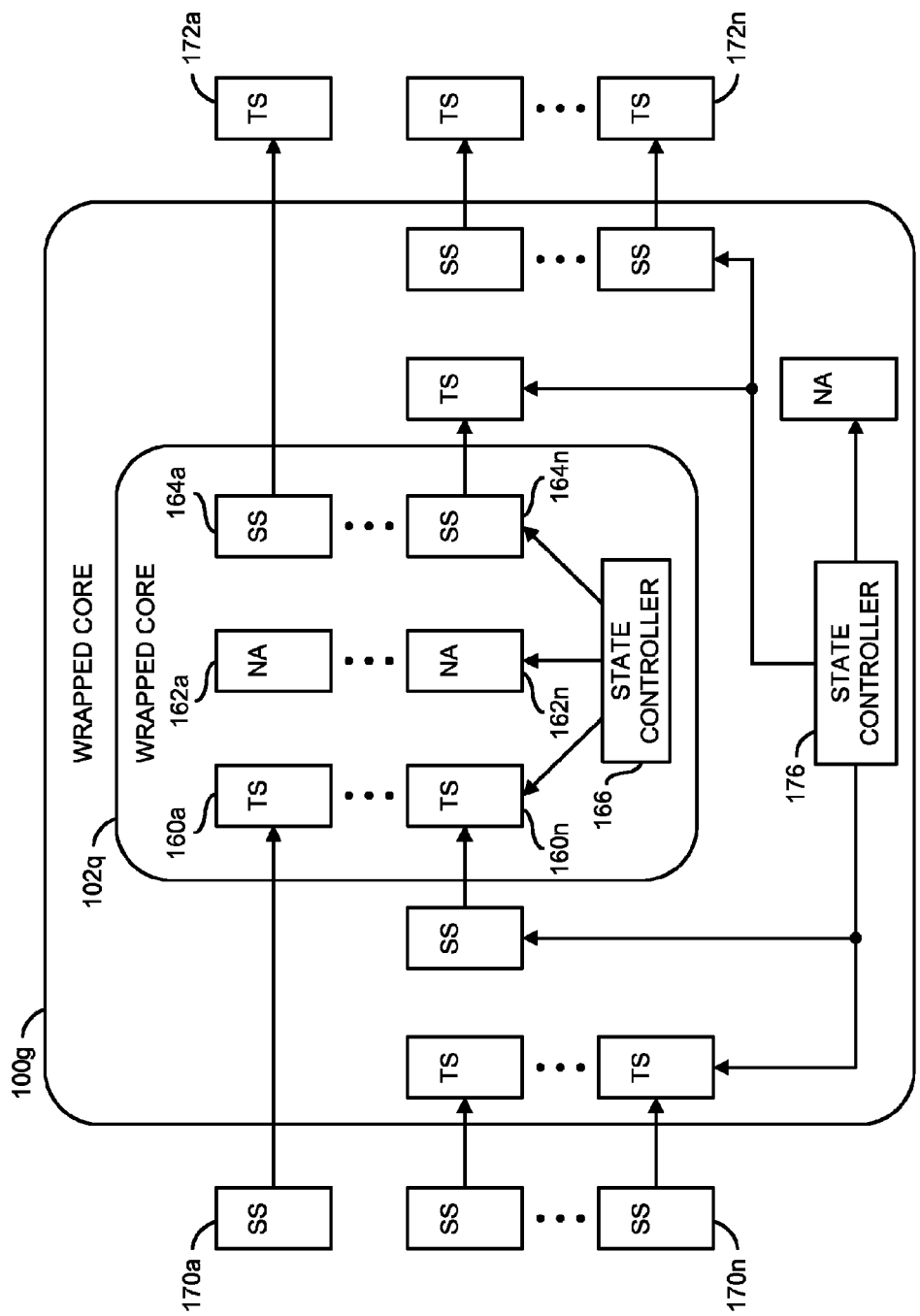

CORE WRAPPING IN THE PRESENCE OF AN EMBEDDED WRAPPED CORE

This application claims the benefit of U.S. Provisional Application Ser. No. 61/692,335, filed Aug. 23, 2012, which is hereby incorporated by reference.

FIELD OF THE INVENTION

The present invention relates to designing circuits for test generally and, more particularly, to a method and/or apparatus for core wrapping in the presence of an embedded wrapped core.

BACKGROUND OF THE INVENTION

Core wrapping is a design-for-test solution that handles testing of large system-on-a-chip (i.e., SoC) designs by implementing and executing tests in a same hierarchical manner as the rest of the design steps (i.e., timing and physical design). The core wrapping enables the tests to be inserted and verified by concurrent teams.

Currently available techniques for hierarchical testing using wrapped cores do not address certain situations. Some situations include designs in which multiple wrapped cores are embedded within another wrapped core. Other situations include designs having multiple levels of nested wrapped cores. Conventional testing of hierarchical implementations treat the designs as a single level hierarchical implementation where different hierarchical cores are sitting adjacent to each other.

Referring to FIG. 1, a diagram of a conventional die 20 having a wrapped embedded core 22 is shown. The die 20 has a wrapper 24, an internal scan chain 26, interface logic 28a-28n and an internal test (i.e., INTEST) test compression logic (i.e., TCL) block 30. The wrapped embedded core 22 includes a wrapper 34.

During an internal test mode, the wrapper 24 and the internal scan chain 26 are driven by the internal test TCL block 30. During an external test mode, the wrapper 24 is driven by an external test (i.e., EXTEST) test compression logic block 36 outside the die 20. Instantiating the wrapped core 22 into the die 20 results in a loss of coverage loss of the interface logic 28a-28n. In the internal test mode, the wrapper 34 is in a non-observation mode, so fault effects through the interface logic 28a-28n cannot be observed. In the external test mode, the internal scan chain 26 is not scanned so the interface logic 28a-28n cannot be controlled.

It would be desirable to implement core wrapping in the presence of an embedded wrapped core.

SUMMARY OF THE INVENTION

The present invention generally concerns an apparatus having a core and one or more logic blocks. The core may be embedded within the apparatus. The core is generally (i) configured to perform a function and (ii) wrapped internally by a first scan chain before being embedded within the apparatus. The logic blocks may be (i) positioned external to the core and (ii) coupled to one or more parallel interfaces of the first scan chain. A second scan chain may be configured to wrap both the logic blocks and the core.

The objects, features and advantages of the present invention include core wrapping in the presence of an embedded wrapped core that may (i) support design-for-test techniques, (ii) enable hierarchical testing, (iii) enable tests to be inserted and verified by concurrent teams working in different geographical locations and different cores, (iv) reduce test generation time, (v) reduce test verification turnaround time, (vi) enable test scheduling of the cores to efficiently deal with issues of test power and defect isolation during debug, (vii) provide nested scan testing of hierarchical cores, (viii) enable sub-design blocks to be plugged into the design independent of the testing configuration and/or (ix) be implemented in an integrated circuit.

BRIEF DESCRIPTION OF THE DRAWINGS

These and other objects, features and advantages of the present invention will be apparent from the following detailed description and the appended claims and drawings in which:

FIG. 13 is a block diagram of a hierarchical test configuration of an embedded wrapped core.

DETAILED DESCRIPTION OF THE PREFERRED EMBODIMENTS

Some embodiments of the present invention generally concern design-for-test (e.g., DFT) logic and techniques that may enable a creation of one or more core isolation wrappers (or scan chains) for cores (or blocks, or cells, or circuits, or macros) that include one or more internally embedded wrapped cores. Furthermore, one or more of the embedded wrapped cores may also contain one or more levels of nested embedded wrapped cores. The logic and/or techniques generally allow all wrapped cores, regardless if such wrapped cores are embedded within another wrapped core or not, to be scheduled independently in an arbitrary manner for core internal testing. A single external test mode is generally sufficient to be established for an entire system-on-a-chip (e.g., SoC) design having the embedded cores. Furthermore, the DFT logic and techniques generally allow configurable testing of nested embedded hierarchical architectures while retaining a plug-and-play nature of the embedded cores.

Figure 1:
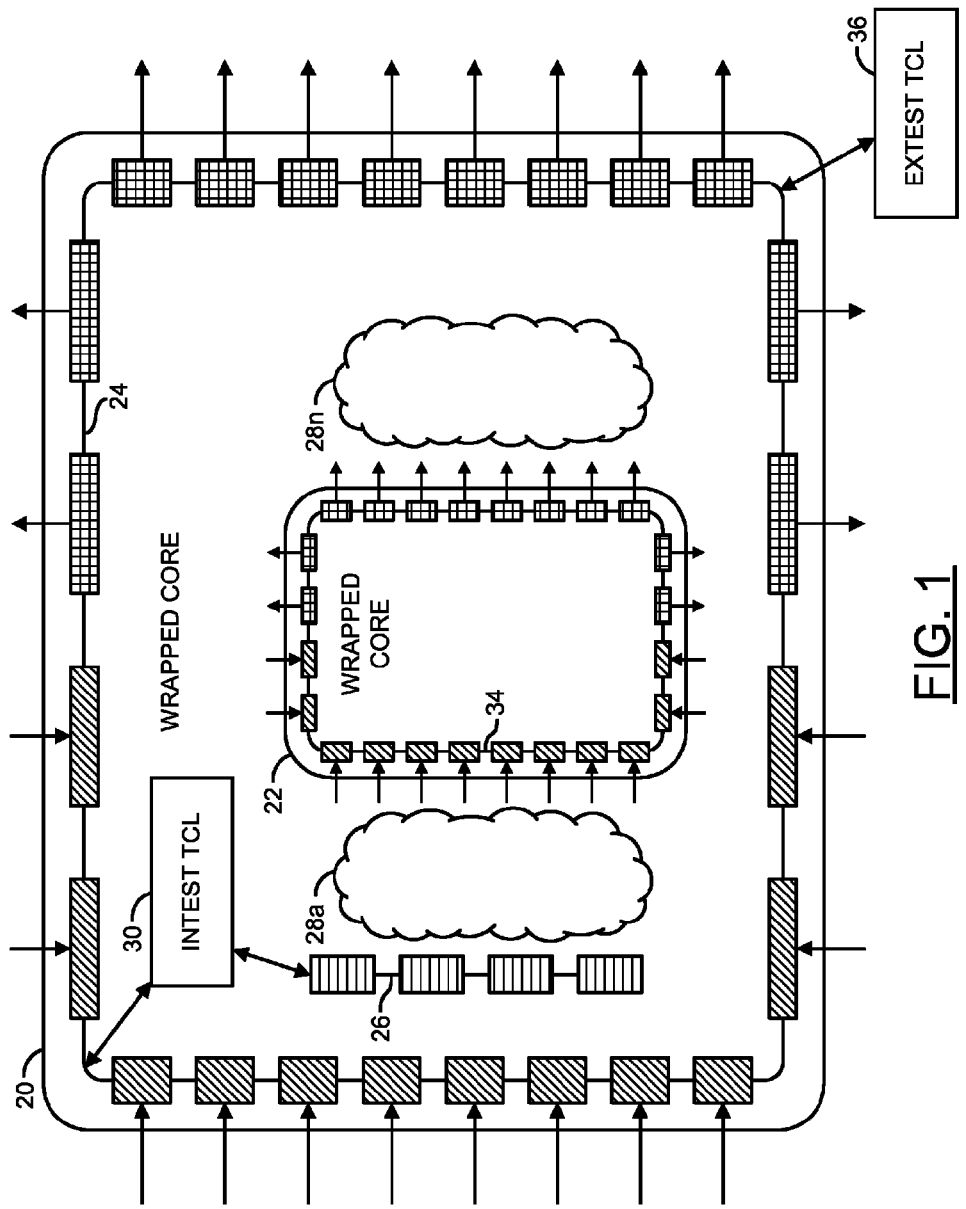
FIG. 1 is a diagram of a conventional die having a wrapped embedded core.
Figure 2:
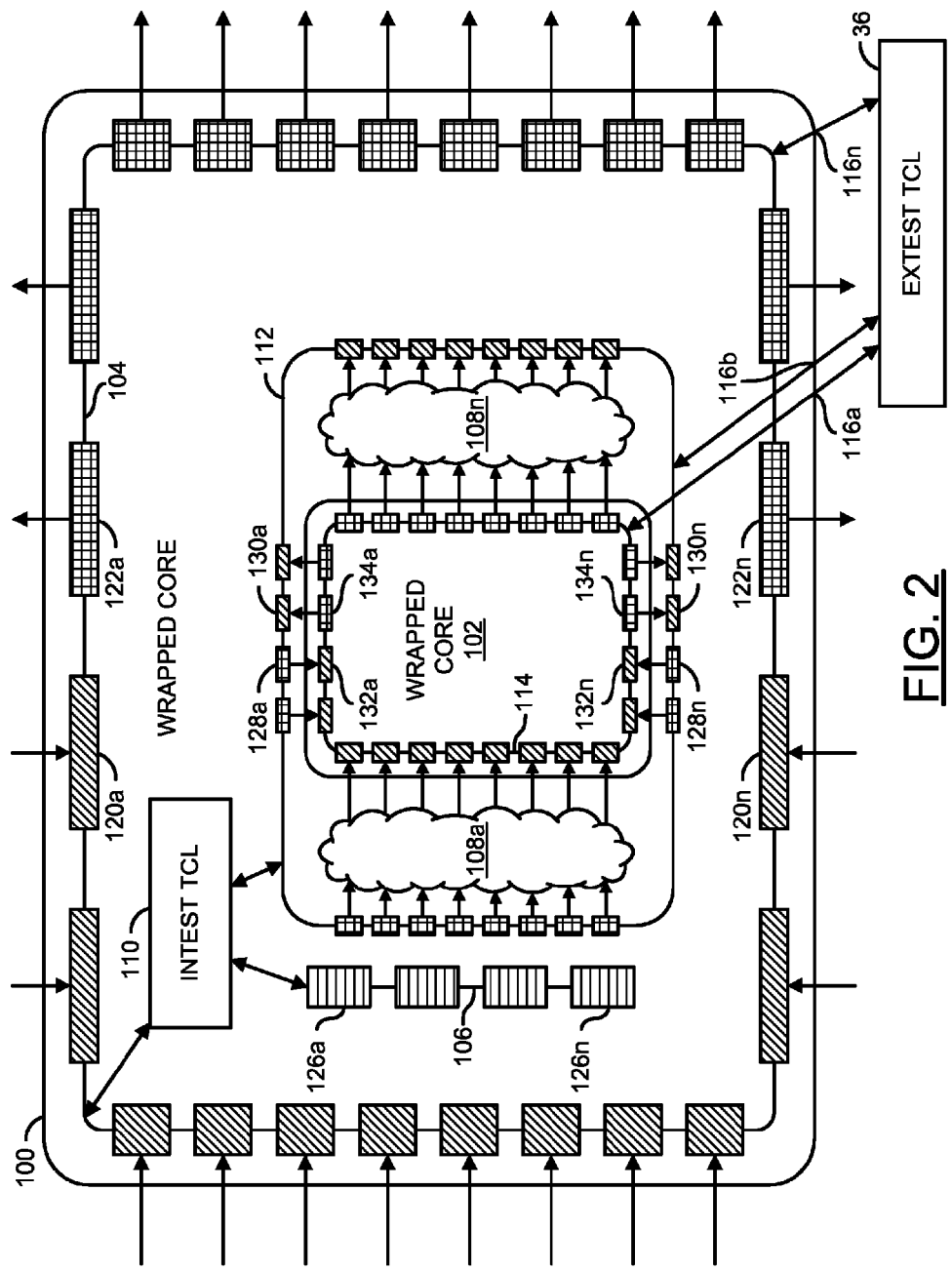
FIG. 2 is a block diagram of an apparatus in accordance with a preferred embodiment of the present invention.

Referring to FIG. 2, a block diagram of an apparatus 100 is shown in accordance with a preferred embodiment of the present invention. The apparatus (or die, or chip, or circuit, or block, or macro, or integrated circuit or wrapped core) 100 may include one or more embedded cores (or circuits) 102 (a single core shown for clarity). The circuit 100 generally comprises a wrapper (or circuit) 104, one or more scan chains (circuits) 106, one or more blocks (or circuits) 108a-108n, a block (or circuit) 110 and a wrapper (or circuit) 112. The core 102 generally includes a wrapper (or circuit) 114. Multiple interface blocks (or circuits) 116a-116n may be provided in the circuit 100 to interface to the external test TLC block 36. The circuits 100 to 116n may represent modules and/or blocks that may be implemented as hardware, software, a combination of hardware and software, or other implementations.

The wrapper 104 generally comprises multiple blocks (or circuits) 120a-120n and multiple blocks (or circuits) 122a-122n. The scan chain 106 may include multiple blocks (or circuits) 126a-126n. The wrapper 112 generally comprises multiple blocks (or circuits) 128a-128n and multiple blocks (or circuits) 130a-130n. The wrapper 114 may include multiple blocks (or circuits) 132a-132n and multiple blocks (or circuits) 134a-134n. The circuits 120a to 134n may represent modules and/or blocks that may be implemented as hardware, software, a combination of hardware and software, or other implementations.

One or more of the circuits 128a-128n and 130a-130n may be directly connected to the circuits 108a-108n. One or more of the circuits 128a-128n and 130a-130n may be directly connected to the circuits 132a-132n and 134a-134n. One or more of the circuits 132a-132n may be directly connected to the circuits 108a-108n. The wrapper 104 may be coupled to the interfaces 116a-116n (e.g., coupled to the interface 116n) and the circuit 110. The wrapper 112 may be coupled to the interfaces 116a-116n (e.g., coupled to the interface 116b) and the circuit 110. The wrapper 114 may be coupled to the interfaces 116a-116n (e.g., coupled to the interface 116a) and the circuit 110. The scan chain 106 may be coupled to the circuit 110.

When the wrapped core 102 is instantiated into the circuit 100, which is also wrapped (e.g., the wrapper 104), an isolation wrapper (e.g., the wrapper 112) may be created around the interface with the embedded wrapped core 102 and the circuits 108a-108n in a manner similar to the wrapper 104 around a periphery of the circuit 100. Input signals driving the embedded wrapped core 102 may be treated as "pseudo" output signals from the circuit 100 and analyzed in the same way as the actual output signals generated by the circuit 100 for the purpose of inclusion in the wrapper. Output signals generated by the embedded wrapped core 102 may be treated as "pseudo" input signals into the circuit 100 and analyzed in the same way as the actual input signals received by the circuit 100 for the purpose of inclusion in the wrapper.

The circuit 100 may implement an electronic circuit having one or more embedded wrapped cores. The circuit 100 is generally operational to perform multiple logic functions. The functions generally accept input data into the circuit 100 through the circuits 120a-120n. Output data generated by the functions may be presented off the circuit 100 through the circuits 122a-122n. The circuit 100 may also be operational to perform internal testing and/or external testing.

The circuit 102 may implement a core circuit. The circuit 102 is generally operational to perform one or more logic functions. The functions generally accept input data into the circuit 102 through the circuits 132a-132n. Output data generated by the functions may be presented off the circuit 102 through the circuits 134a-134n. The circuit 102 may also be operational to perform internal testing and/or external testing.

The wrapper 104 may implement a scan chain (or peripheral wrapper). The wrapper 104 is generally operational to control data flows into and out from the circuit 100. In a normal operational mode, the wrapper 104 may pass data unaltered from input interfaces to output interfaces of the various scan cells. In one or more test modes, the wrapper 104 may be operational to scan data into the circuits 120a-120n and/or 122a-122n serially, present and/or capture data in parallel, and read out the captured data sequentially. The wrapper 104 may be controlled by the circuit 110 and the circuit 36 (when connected to the circuits 116a-116n).

The circuit 106 may implement a scan chain. The scan chain 106 is generally operational to control data flows internal to the circuit 100. In the normal operational mode, the scan chain 106 may pass data through unaltered. In one or more test modes, the scan chain 106 may be operational to scan data into the circuits 126a-126n serially, present and/or capture data in parallel, and read out the captured data sequentially. The scan chain 106 may be controlled by the circuit 110.

The circuit 108a-108n may implement logic circuits. The circuits 108a-108n are generally operational to provide glue logic to interface the circuit 102 with the rest of the circuit 100. Each circuit 108a-108n may be coupled between the circuit 102 and the wrapper 112.

The circuit 110 may implement an internal test (e.g., INTEST) test compression logic (e.g., TLC) circuit for test compression. The circuit 110 may be coupled to the wrappers 104, 106 and 112. The circuit 110 is generally operational to conduct the internal tests of the circuit 100. The circuit 110 may also be operational to conduct interface testing of the interfaces between (i) the circuit 100 and the external world and (ii) the circuit 100 and the circuit 102. The circuit 110 may also conduct testing of the circuit 102 via the wrapper 112.

The wrapper 112 may implement a scan chain (or isolation wrapper). The wrapper 112 is generally operational to control data flows between the circuit 100 and the combination of the circuits 102 and 108a-108n. In the normal operational mode, the wrapper 112 may pass data unaltered from input interfaces to output interfaces of the various scan cells. In one or more test modes, the wrapper 112 may be operational to scan data into the circuits 128a-128n and/or 130a-130n serially, present and/or capture data in parallel, and read out the captured data sequentially. The wrapper 112 may be controlled by the circuit 110 and the circuit 36, when connected.

The wrapper 114 may implement a scan chain (or peripheral wrapper). The wrapper 104 is generally operational to control data flows into and out from the circuit 102. In the normal operational mode, the wrapper 114 may pass data unaltered from input interfaces to output interfaces of the various scan cells. In one or more test modes, the wrapper 114 may be operational to scan data into the circuits 132a-132n and/or 134a-134n serially, present and/or capture data in parallel, and read out the captured data sequentially. The wrapper 114 may be controlled by the circuit 36.

Each circuit 116a-116n may implement an interface (or port) circuit. The circuits 116a-116n are generally operational to provide communication of data and commands between the wrappers (e.g., the wrappers 104, 112 and 114) and the circuit 36.

Each circuit 120a-120n, 122a-122n, 126a-126n, 130a-130n, 132a-132n and 134a-134n may implement a scan cell circuit. The circuits 120a-120n, 130a-130n and 132a-132n may implement input-types of scan cells. The circuit 122a-122n, 128a-128n and 134a-134n may implement output-types of scan cells. In some embodiments, one or more of the scan cell circuits may implement bidirectional-types of scan cells. In the normal operational mode, the scan cell circuits may be operational to pass data through from input interfaces to output interfaces. In the one or more test modes, some scan cell circuits may be loaded with test data serially from the circuit 110 and/or the circuit 36, present the test data in parallel, capture new data, and serially present the captured data to the circuit 110 and/or the circuit 36. Some scan cells may implement a shift-only state (e.g., SS). In the shift-only state, the scan cells generally act as launch points for data serially scanned into the cells. Shifted data may be loaded into such scan cells by a shift operation via a scan path but data is typically not captured via a functional path. Other scan cells may implement a transparent state (e.g., TS). In the transparent state, the scan cells generally act as any other scan, flip-flop in which data may be shifted via the shift path and data may be captured via the functional path.

The circuits 120a-120n and 122a-122n generally form the wrapper 104 at an external boundary of the circuit 100. The circuits 126a-126n may form the scan chain 106 internal to the circuit 100. The circuits 128a-128n and 130a-130n may form the wrapper 112 at the interface between (i) the circuit 102 and the circuits 108a-108n and (ii) the rest of the circuit 100. The circuits 132a-132n and 134a-134n may form the wrapper 114 at an outer boundary of the circuit 102.

For internal testing of the wrapped cores (e.g., the circuits 100 and 102), no dependencies generally exist between the circuit 100 and the circuit 102. The circuit 102 may be tested independently of the operation of the rest of the circuit 100. The circuit 100 may be tested independently of the operation of the circuit 102. Therefore, all the embedded wrapped cores (e.g., the circuit 102) and the rest of the circuit 100 may be scheduled for testing either in the same internal test session or in different internal test sessions.

For interface testing (e.g., EXTEST) (i) at the external interfaces of the circuit 100 and (ii) between the circuit 102 and the rest of the circuit 100, a single interface (or external) test session may be supported for testing (i) the circuits 100/102 and (ii) an entire SoC in which the circuits 100/102 are a part. The interface connections (e.g., the circuits 120a-120n, 122a-122n, 128a-128n, 130a-130, 132a-132n and 134a-134n) between the embedded wrapped cores and the external wrapped core may be tested in the external test mode.

A single external test mode may be defined for the entire SoC. In the single external test mode, only the circuits 108a-108n may be tested. Therefore, the remaining logic within the circuits 100 and 102 may be removed from a netlist representation used for an external test mode pattern generation and simulation of the SoC. The operation of the circuit 100/102 may be emulated by controlling the wrappers 104, 112 and 114 with the circuit 36.

Figure 3:
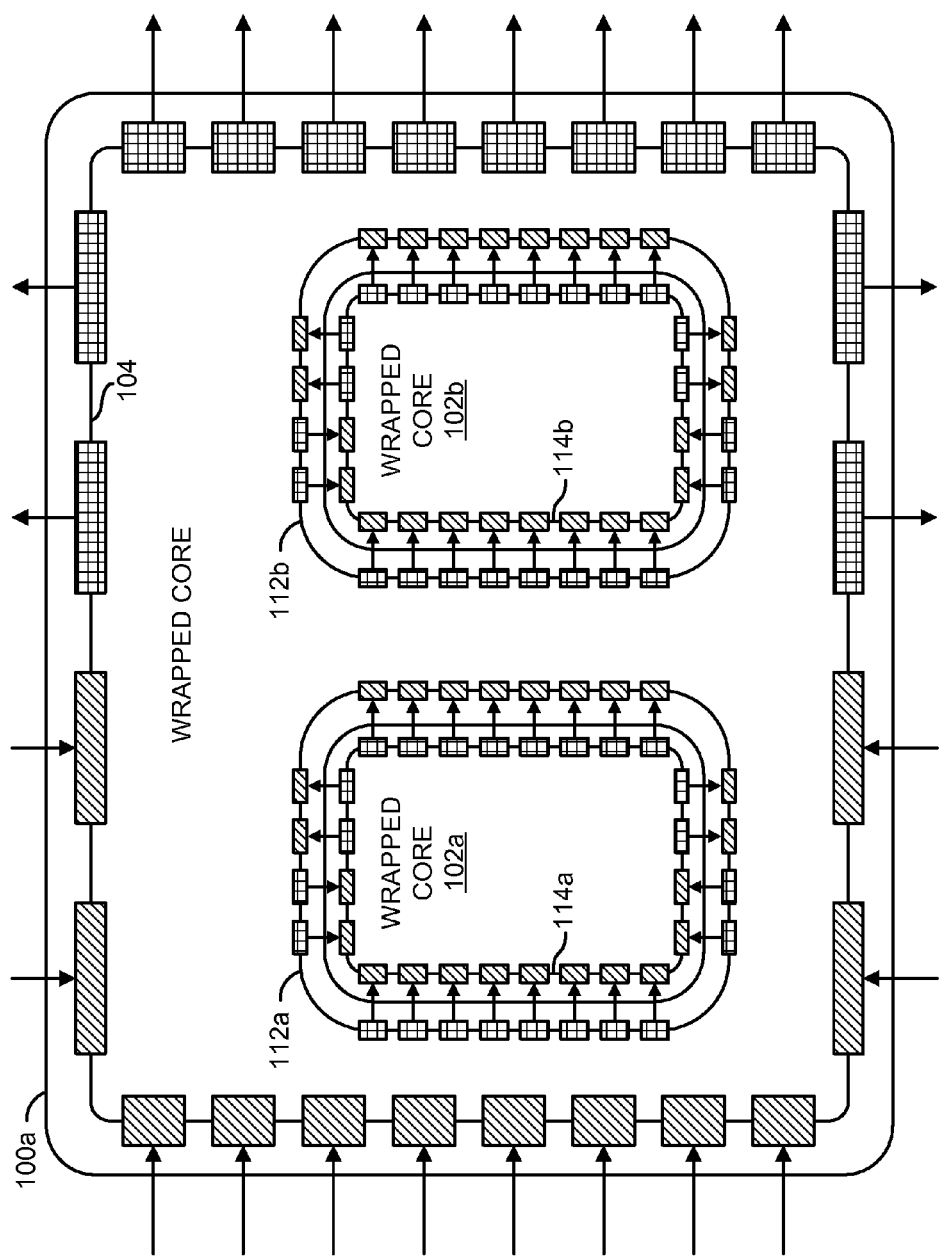
FIG. 3 is a block diagram of an example implementation of a multi-embedded core circuit.

Referring to FIG. 3, a block diagram of an example implementation of a multi-embedded core circuit 100a is shown. The circuit 100a may be a variation of the circuit 100. The circuit 100a generally comprises multiple cores (or circuits) 102a-102b, the wrapper 104 and multiple wrappers (or circuits) 112a-112b. The circuits 102a-102b may be embedded wrapped cores within the circuit 100a. Each circuit 102a-102b generally comprises a respective wrapper (or circuit) 114a-114b. The circuits 100a-114b may represent modules and/or blocks that may be implemented as hardware, software, a combination of hardware and software, or other implementations. The circuits 102a-102b may be the same as or variations of the circuit 102. In some embodiments, the circuits 102a and 102b may be instantiations of the same core. In other embodiments, the circuit 102a may have a different design than the circuit 102b.

The multiple embedded wrapped cores 102a-102b and the remainder of the circuit 100a may all be scheduled independently during internal testing either in the same internal test session or across multiple internal test sessions in any arbitrary grouping of the wrapped cores.

Figure 4:
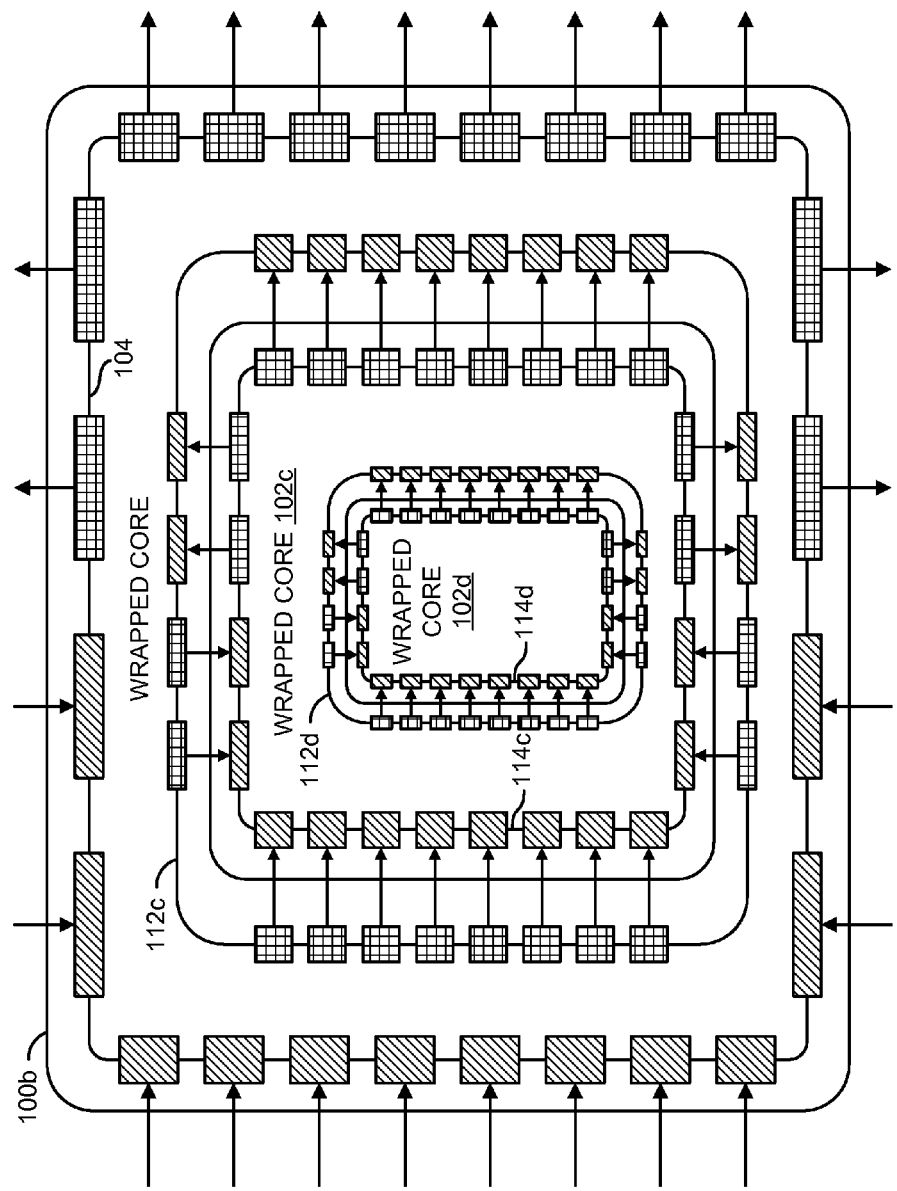
FIG. 4 is a block diagram of an example implementation of nested embedded wrapped cores.

Referring to FIG. 4, a block diagram of an example implementation of a nested embedded wrapped circuit 100b is shown. The circuit 100b may be a variation of the circuits 100 and/or 100a. The circuit 100b generally comprises multiple cores (or circuits) 102c-102d, the wrapper 104 and a wrapper (or circuit) 112c. The circuit 102d may be an embedded wrapped core within the circuit 102c. The circuit 102c may be an embedded wrapped core within the circuit 100b. The circuit 102c generally comprises a wrapper (or circuit) 112d and a wrapper (or circuit) 114c. The circuit 102d generally comprises a wrapper (or circuit) 114d. The circuits 100b-114d may represent modules and/or blocks that may be implemented as hardware, software, a combination of hardware and software, or other implementations. The circuits 102c-102d may be the same as or variations of the circuits 102, 102a and/or 102b.

Embedding of wrapped cores may be performed at any level by providing a corresponding isolation wrapper (e.g., wrappers 112c-112d). The multiple embedded wrapped cores may all be scheduled independently during internal testing either in the same internal test session or across multiple internal test sessions in any arbitrary grouping of the wrapped cores.

Figure 5:
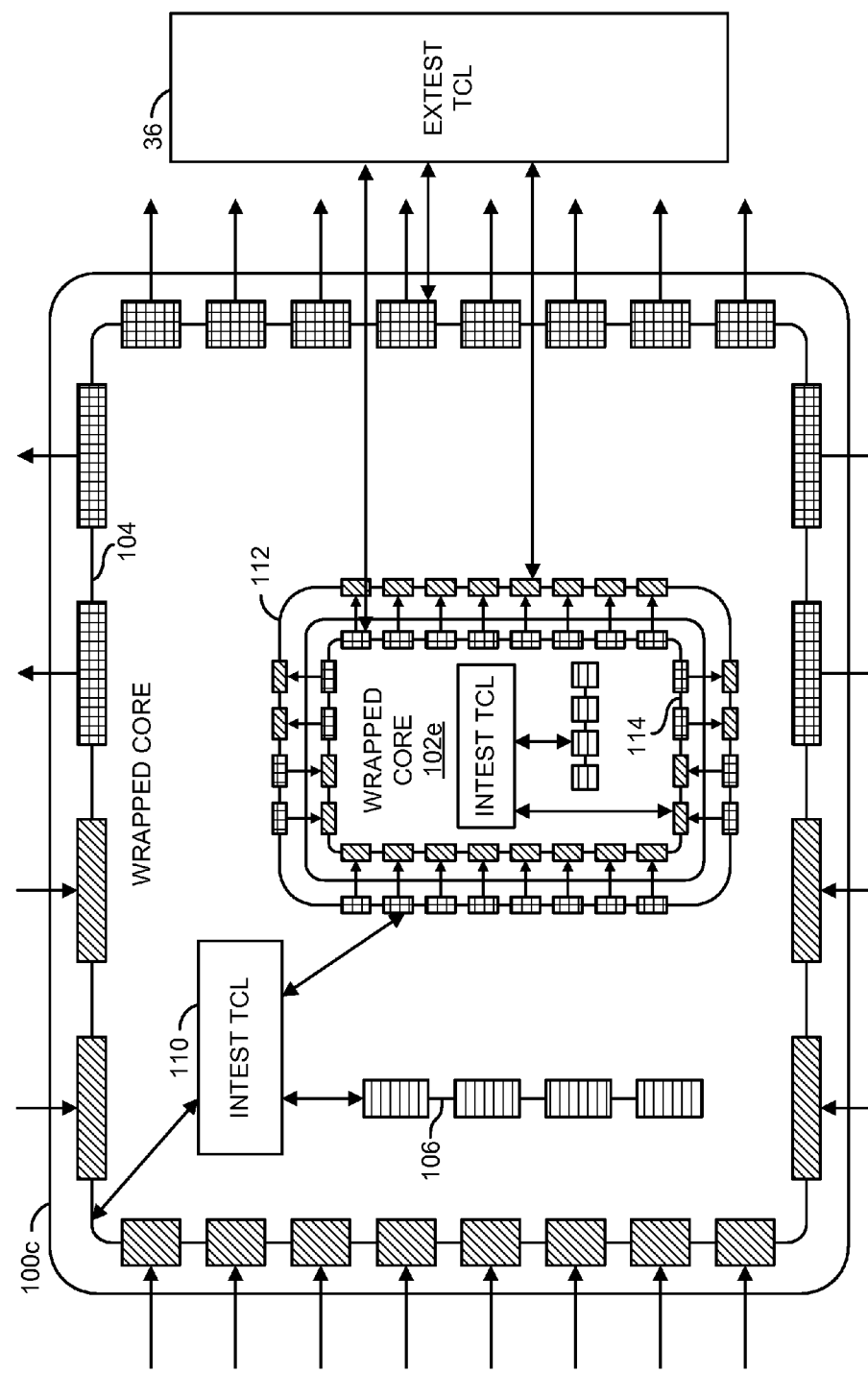
FIG. 5 is a block diagram of an example implementation of a circuit having wrapper chain connections.

Referring to FIG. 5, a block diagram of an example implementation of a circuit 100c having wrapper chain connections is shown. The circuit 100c may be a variation of the circuits 100, 100a and/or 100b. The circuit 100c generally comprises a core (or circuit) 102e, the wrapper 104, the scan chain 106, the circuit 110 and the wrapper 112. The circuit 102e may be an embedded wrapped core within the circuit 100c. The circuit 102e generally comprises the wrapper 114. The circuits 100c-114 may represent modules and/or blocks that may be implemented as hardware, software, a combination of hardware and software, or other implementations. The circuit 102e may be the same as or a variation of the circuits 102, 102a, 102b, 102c and/or 102d.

The circuit 102e may include an INTEST TCL circuit. The INTEST TCL circuit may be operational to perform testing of the circuit 102e. The wrapper 114 and any other internal scan chains within the circuit 102e may be connected to the INTEST TCL circuit designed into the circuit 102e.

When multiple embedded wrapped cores are present, the circuit 36 and/or any other compression logic may drive all of the wrappers (e.g., wrapper 114) of the embedded wrapped cores (e.g., circuit 102e) and the wrappers (e.g., wrappers 104 and 112) of the outside core (e.g., 100c).

Figure 6:
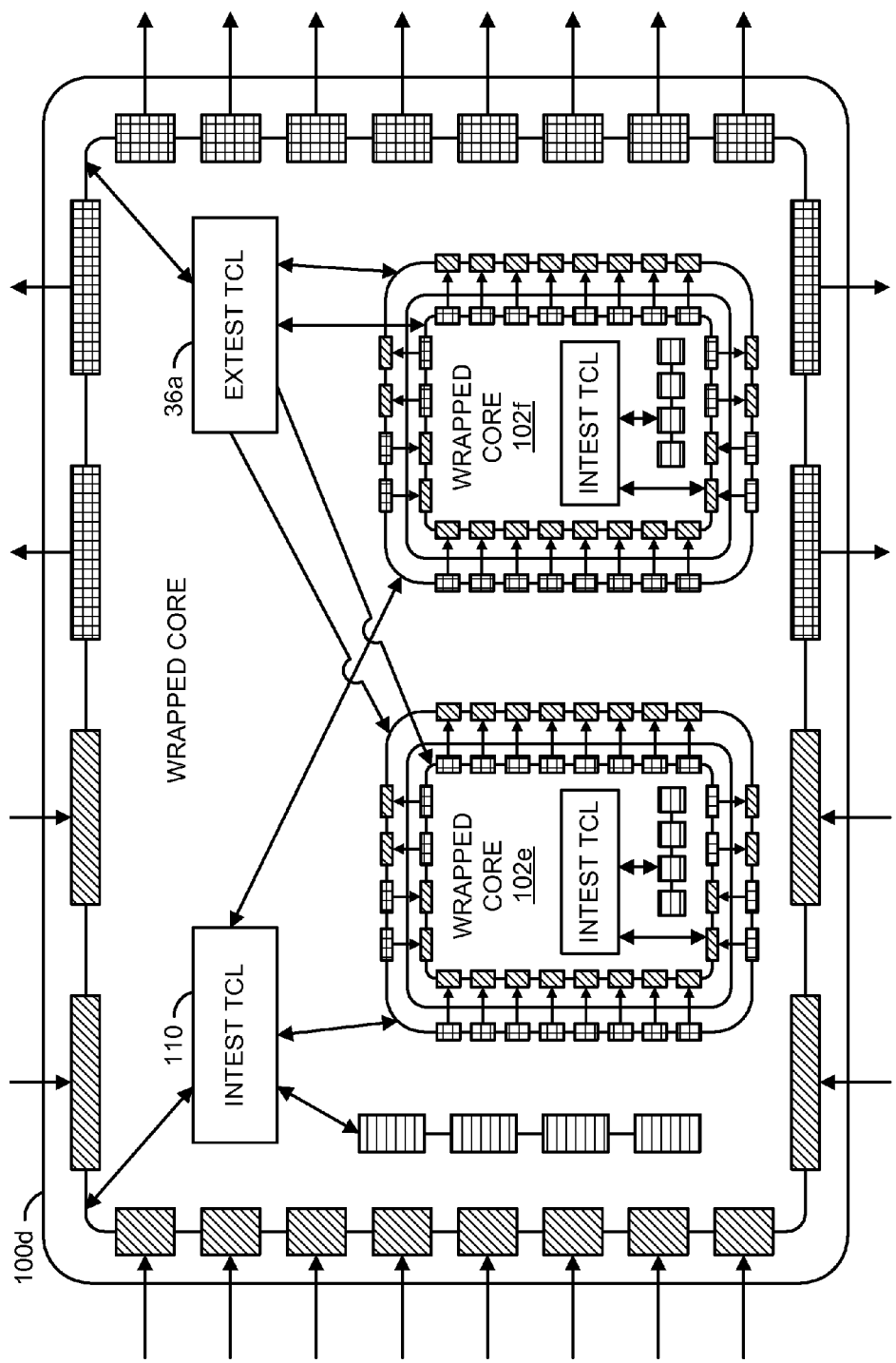
FIG. 6 is a block diagram of an example implementation of another circuit having wrapper chain connections.

Referring to FIG. 6, a block diagram of an example implementation of another circuit 100d having wrapper chain connections is shown. The circuit 100d may be a variation of the circuits 100, 100a, 100b and/or 100c. The circuit 100d generally comprises the circuit 102e, a core (or circuit) 102f and a block (or circuit) 36a. The circuit 102f may be an embedded wrapped core within the circuit 100d. The circuits 36a, 100d-102f may represent modules and/or blocks that may be implemented as hardware, software, a combination of hardware and software, or other implementations. The circuit 102f may be the same as or a variation of the circuits 102, 102a, 102b, 102c, 102d and/or 102e. In some embodiments, the circuits 102e and 102f may be instantiations of the same core. In other embodiments, the circuit 102e may have a different design than the circuit 102f.

The circuit 36a may be the same as or a variation of the circuit 36. The circuit 36a may be operational to test the circuits 100d, 102e and/or 102f. When multiple embedded wrapped cores are present, the circuit 36a may be operational to drive all of the wrapper chains of the embedded wrapped cores (e.g., circuits 102e and 102f) and the outside core (e.g., circuit 100d). The circuit 110 may be operational to test the circuit 110d and control the interfaces between (i) the circuit 102e and the rest of the circuit 100d and (ii) the circuit 102f and the rest of the circuit 100d.

Figure 7:
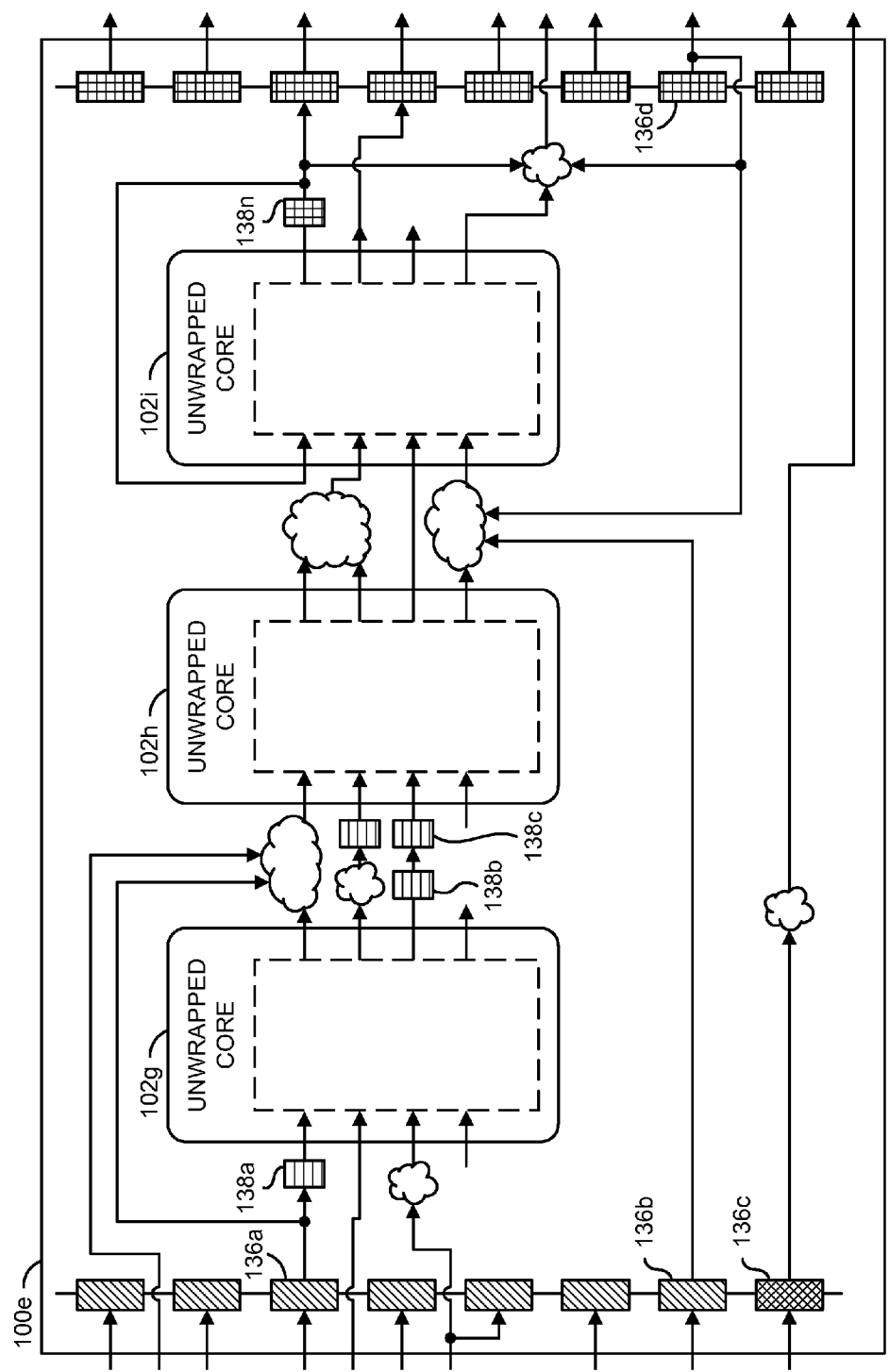
FIG. 7 is a block diagram of an example implementation of a circuit with embedded unwrapped cores.

Referring to FIG. 7, a block diagram of an example implementation of a circuit 100e with embedded unwrapped cores is shown. The circuit 100e may be a variation of the circuits 100, 100a, 100b, 100c and/or 100d. The circuit 100e generally comprises a block (or circuit) 102g, a block (or circuit) 102h, a block (or circuit) 102i, multiple blocks (or circuits) 136a-136d and multiple blocks (or circuits) 138a-138n. The circuits 102g-102i may be embedded unwrapped cores within the circuit 100e. The circuits 100e, 102g-102i and 136a-138n may represent modules and/or blocks that may be implemented as hardware, software, a combination of hardware and software, or other implementations. In some embodiments, the circuits 102g-102i may be instantiations of the same core. In other embodiments, the circuits 102g-102i may have different designs.

Since none of the circuits 102g-102i are wrapped, the circuits 102g-102i may be treated as part of the circuit 100e for self-test purposes. No extra wrappers may be applied around the circuits 102g-102i to control the interfaces. The circuits 136a-136d and 138a-138n may be treated as input, output and/or bidirectional wrapper (or scan) cells. For example, each circuit 136a and 136b may be implemented as input scan cell circuit. The circuit 136c may be implemented as a bidirectional scan cell circuit. The circuit 136d may be implemented as an output scan cell circuit. Each circuit 138a-138c may be implemented as part of the core scan chains of the circuit 100e. The circuit 138n may implement another output scan cell circuit.

Figure 8:
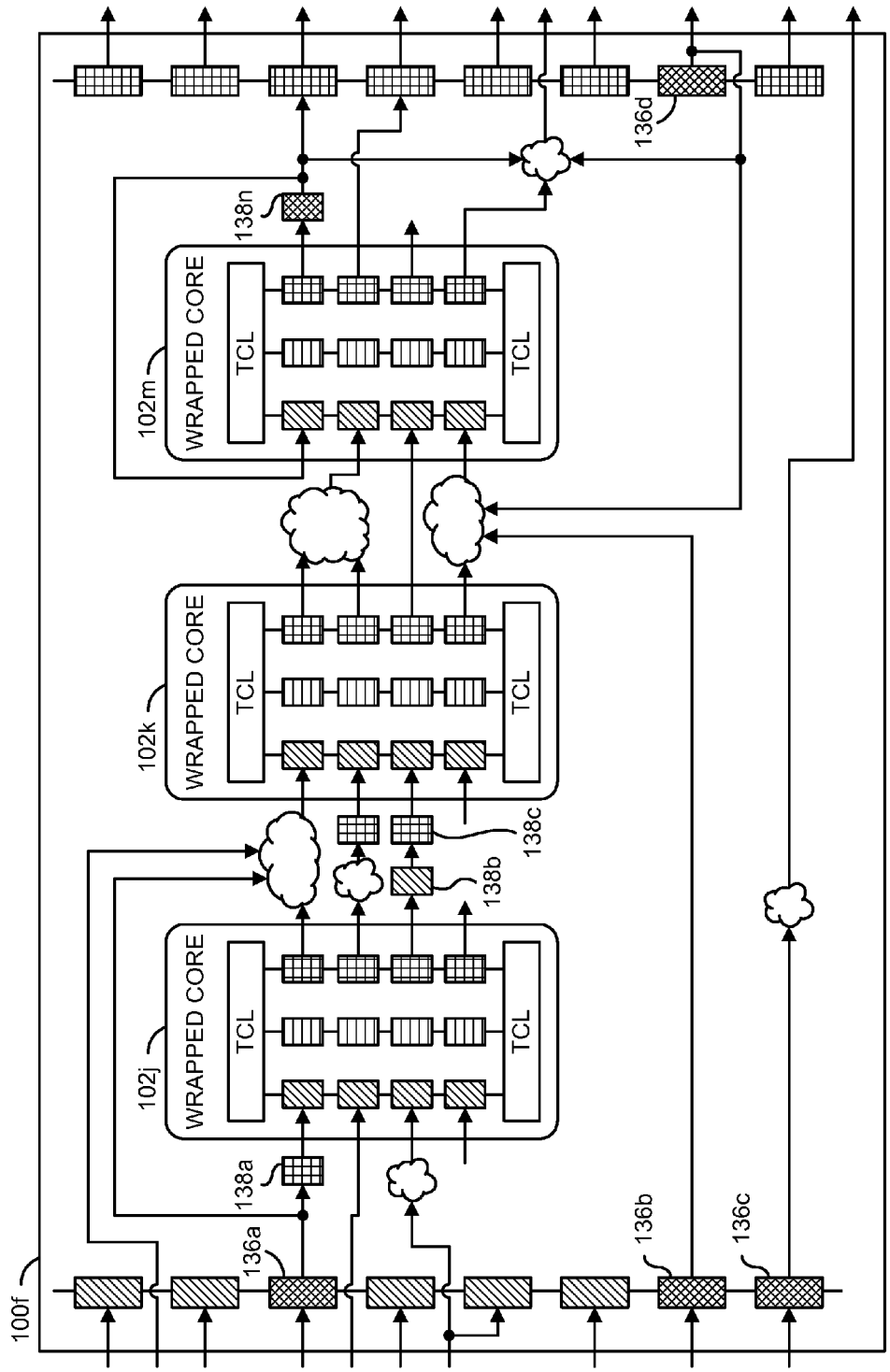
FIG. 8 is a block diagram of an example implementation of a circuit with embedded wrapped cores.

Referring to FIG. 8, a block diagram of an example implementation of a circuit 100f with embedded wrapped cores is shown. The circuit 100f may be a variation of the circuits 100, 100a, 100b, 100c, 100d and/or 100e. The circuit 100f generally comprises a block (or circuit) 102j, a block (or circuit) 102k, a block (or circuit) 102m, the circuits 136a-136d and the circuits 138a-138n. The circuits 102j-102m may be embedded wrapped cores within the circuit 100f. The circuits 100f, 102j-102m, 136a-136d and 138a-138n may represent modules and/or blocks that may be implemented as hardware, software, a combination of hardware and software, or other implementations. In some embodiments, the circuits 102j-102m may be instantiations of the same core. In other embodiments, the circuits 102j-102m may have different designs.

In the presence of embedded wrapped cores, the wrapper chain analysis for the outer core is generally changed relative to the circuit 100f. The circuits 136a-136d may form part of the outer wrapper (e.g., wrapper 104). One or more of the circuits 136a-136d (e.g., the circuits 136a, 136b and 136d) may be adjusted relative to the circuit 100e (FIG. 7) to operate as bidirectional scan cell circuits in the circuit 100f. The circuit 138a-138n may by adjusted from being part of one or more internal scan chains within the circuit 100e to operate as part of an isolation wrapper (e.g., wrapper 112) at the interfaces between (i) the circuit 100f and the circuits 102j-102m and (ii) between the circuits 102j-102m and each other. Some of the circuits 138a-138n (e.g., 138a and 138c) may be operational as output scan cells of the isolations wrappers. Some of the circuits 138a-138n (e.g., 138b) may be operational as input scan cells of the isolation wrappers. Some of the circuits 138a-138n (e.g., 138n) may be operational as input scan cells, output scan cells or bidirectional scan cells of the isolation wrappers.

Figure 9:
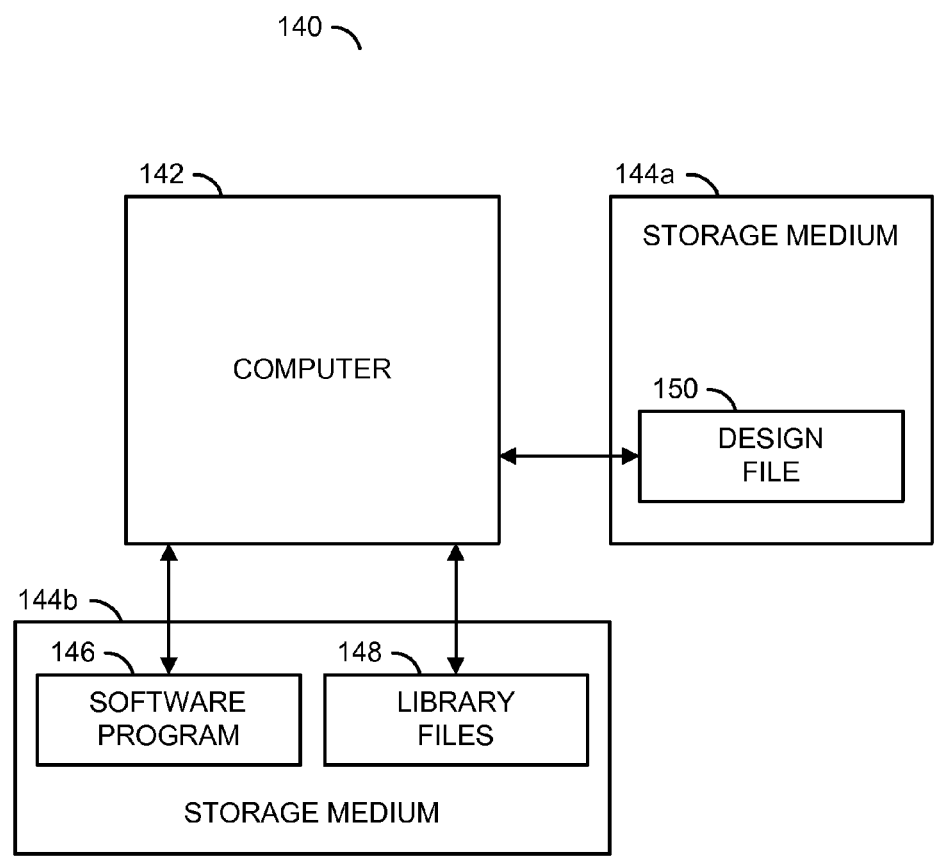
FIG. 9 is a block diagram of an example apparatus implementing a method for circuit design in the presence of an embedded wrapped core.

Referring to FIG. 9, a block diagram of an example apparatus 140 implementing a method for circuit design in the presence of an embedded wrapped core is shown. The apparatus (or system or circuit) 140 may be implemented as a computer (or processor) 142 and one or more storage media (or memory devices) 144a-144b. The storage media 144a-144b may be implemented as non-transitory media.

A storage medium 144b may store a software program (or program instructions) 146 and a library 148. The software program 146 may define multiple steps of a circuit design in the presence of one or more embedded wrapped cores. The library 148 may define one or more files of wrapped and/or unwrapped cores. The storage medium 144a may hold a design file 150 containing one or more designs of one or more circuits (e.g., circuits 100-100g).

The software program 146 may be read and executed by the computer 142 to implement the process of designing circuits with the embedded wrapped cores. During the circuit design, one or more wrapped and/or unwrapped cores may be read from the library 148 and embedded (added) to the circuit design being created. The circuit design process may include adding logic blocks (e.g., circuits 108a-108n) to interface the embedded cores to the rest of the circuit. Isolation wrappers (e.g., wrapper 112) may also be added around each embedded wrapped core to support design-for-test. The internal/isolation wrappers (or scan chains) may be coupled to one or more internal test circuits (e.g., circuit 110 and circuit 36a) and/or one or more ports (e.g., ports 116a-116n) connectable to one or more external test circuits (e.g., circuits 36). The completed design may be stored in the file 150.

Figure 10:
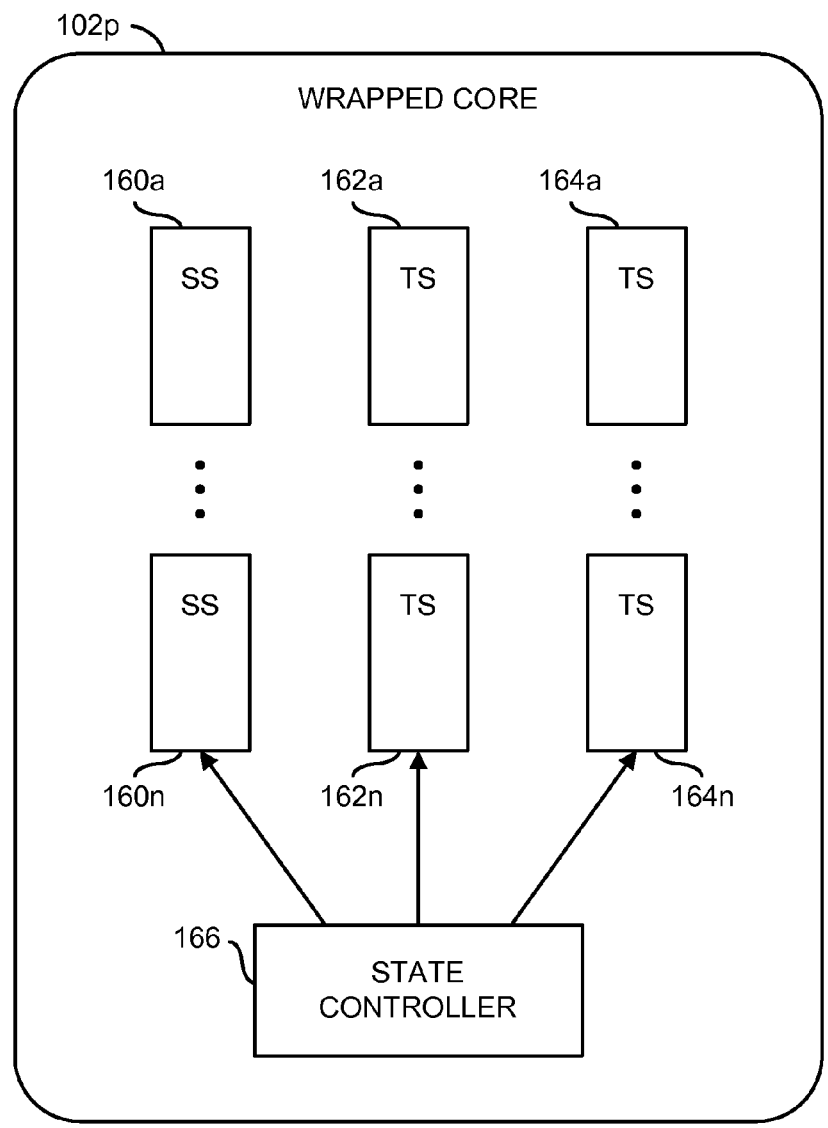
FIG. 10 is a block diagram of an example internal test configuration of an embedded wrapped core.

Referring to FIG. 10, a block diagram of an example internal test configuration of an embedded wrapped core 102p is shown. The circuit 102p may be an embedded wrapped core within any one or more of the circuits 100-100g. The circuit 102p generally comprises one or more blocks (or circuits) 160a-160n, one or more blocks (or circuits) 162a-162n, one or more blocks (or circuits) 164a-164n and a block (or circuit) 166. The circuits 160a-166 may represent modules and/or blocks that may be implemented as hardware, software, a combination of hardware and software, or other implementations. The circuit 102p may be the same as or a variation of the circuits 102-102l and/or 102m.

Each circuit 160a-160n, 162a-162n and 164a-164n may implement a scan cell circuit. The circuits 160a-160n may implement input-types of scan cells (e.g., an input isolation scan chain). The circuit 162a-162n may implement internal-types of scan cells (e.g., an internal scan chain). The circuit 164a-164n may implement output-types of scan cells (e.g., an output isolation scan chain). In some embodiments, one or more of the scan cell circuits may implement bidirectional-types of scan cells. In the normal operational mode, the scan cell circuits may be operational to pass data through from input interfaces to output interfaces. In the one or more test modes, some scan cell circuits may be loaded with test data serially, present the test data in parallel, capture new data, and serially present the captured data. Some scan cell circuits may implement the shift-only state. Other scan cell circuits may implement the transparent state.

The circuit 166 may implement a state controller circuit. The circuit 166 is generally operational to configure states of the circuits 160a-160n, 162a-162n and 164a-164n into different modes (or states) for both testing and normal operation. The modes generally include the internal test mode, the external test mode and a modular mode. The modes may be local to the circuit 102p. Control of the modes may be provided via a JTAG (e.g., Joint Test Action Group) IEEE 1149.1 standard interface. Other test interfaces may be implemented to meet the criteria of a particular application.

In the internal test mode, the circuits 160a-160n may be commanded into the shift-only state to receive test data from an INTEST TCL. The circuits 162a-162n may be commanded into the transparent state to allow the circuit 102p to function as normal. The circuits 164a-164n may also be commanded into the transparent state to (i) allow the circuit 102p to function as normal and (ii) capture results data generated in response to the test data. Clock paths within the circuit 102p may be clock gated effectively to control test power.

Figure 11:
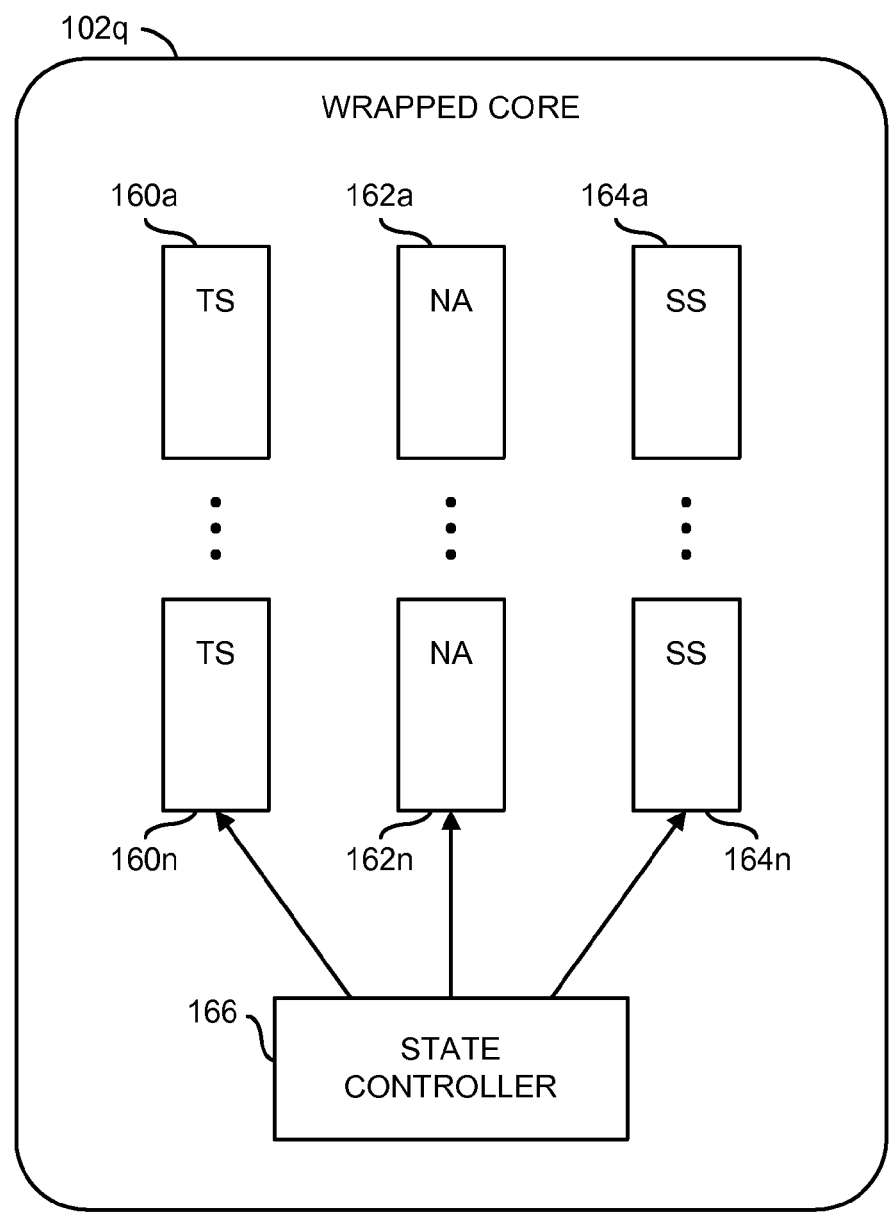
FIG. 11 is a block diagram of an example external test configuration of an embedded wrapped core.

Referring to FIG. 11, a block diagram of an example external test configuration of an embedded wrapped core 102q is shown. The circuit 102q may be an embedded wrapped core within any one or more of the circuits 100-100g. The circuit 102q generally comprises the circuits 160a-160n, the circuits 162a-162n, the circuits 164a-164n and the circuit 166. The circuit 102q may be the same as or a variation of the circuits 102-102m and/or 102p.

In the external test mode, (i) the circuits 160a-160n may be commanded into the transparent state to receive results data at the input ports. The circuits 162a-162n may be commanded into a not active (e.g., NA) state because the circuitry internal to the circuit 102q may not be operational. The circuit 164a-164n may be commanded into the shift-only state to allow the circuit 102q to present test data at the output ports. Clock paths within the circuit 102q may be clock gated effectively to control test power.

Figure 12:
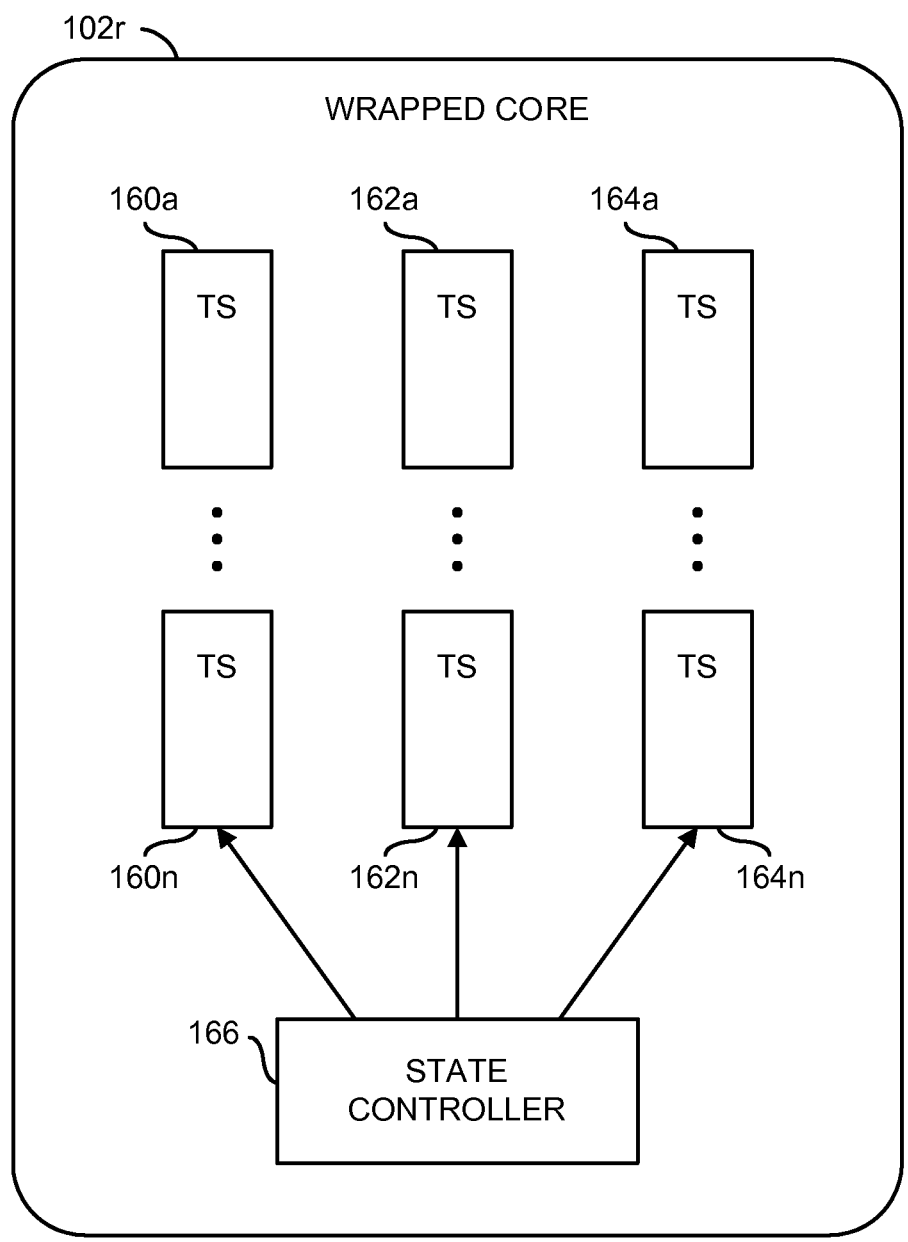
FIG. 12 is a block diagram of an example modular test configuration of an embedded wrapped core.

Referring to FIG. 12, a block diagram of an example modular test configuration of an embedded wrapped core 102r is shown. The circuit 102r may be an embedded wrapped core within any one or more of the circuits 100-100g. The circuit 102r generally comprises the circuits 160a-160n, the circuits 162a-162n, the circuits 164a-164n and the circuit 166. The circuit 102r may be the same as or a variation of the circuits 102-102p and/or 102q.

In the modular test mode, all of the circuits 160a-160n, 162a-162n and 164a-164n may be commanded into the transparent state such that the circuit 102r operates as normal. Therefore, any data received at the input ports by the circuits 160a-160n may be processed by the internal circuitry and the results presented at the output ports by the circuits 164a-164n.

Referring to FIG. 13, a block diagram of a hierarchical test configuration of the embedded wrapped core 102q is shown. The circuit 102q may be embedded within a block (or circuit) 100g. Several blocks (or circuits) 170a-170n may provide test data into the circuit 100a. Several blocks (or circuits) 172a-172n may receive results data from the circuit 100g. The circuit 100g may include a block (or circuit) 176. The circuit 100g may be a variation of, or the same as the circuits 100-100e and/or 100f. The circuits 170a-176 may represent modules and/or blocks that may be implemented as hardware, software, a combination of hardware and software, or other implementations.

The circuits 170a-170n and 172a-172n may implement scan cells in one or more scan chains. The circuits 170a-170n may be operational to transfer test data directly into the (outer wrapped core) circuit 100g and the (inner wrapped core) circuit 102q. In the example, the circuit 170a may be connected directly to the circuit 160a. The circuits 172a-172n may be operational to receive results data directly from the circuit 100g and the circuit 102q. In the example, the circuit 172a may connected directly to the circuit 164a.

The circuit 176 may implement a state controller circuit. The circuit 176 is generally operational to control the state of the scan chains and scan cells within the circuit 100g, not including the scan chains and scan cells within the circuit 102q. The circuit 176 may command the scan chains and scan cells into the transparent state, the shift-only state and/or the not active state.

The circuit 176 generally merges the isolation scan chains (e.g., circuits 160a-160n and 164a-164n) with the internal scan chains of the circuit 100g while the circuit 100g is in a respective internal test mode. The circuit 176 may merge the isolation scan chains of the circuit 102q with isolation scan chains of the circuit 100g while the circuit 100g is in a respective external test mode. Nested embedded hierarchical scenarios for the circuit 100g are generally described in Table I as follows:

TABLE I

| Mode | | Circuit 100 g | | | Circuit 102 q | | |
|---|---|---|---|---|---|---|---|
| Circuit 100 g | Circuit 102 q | Intern. Chain State | Input Isolate Chain State | Output Isolate Chain State | Intern. Chain State | Input Isolate Chain State | Output Isolate Chain State |
| Intern. | Extern. | TS | SS | TS | NA | TS | SS |
|  | Intern. | NA | NA | NA | TS | SS | TS |
| Extern. | Extern. | NA | TS | SS | NA | TS | SS |
| Intern. | Modular | TS | SS | TS | TS | TS | TS |

The core wrapping generally supports design-for-test solutions to handle testing of SoCs by implementing and executing tests in the same hierarchical manner as the rest of the design steps (e.g., timing, physical design etc.). The core and the isolation wrappers may enable tests to be inserted and verified by concurrent teams working in different geographic locations on different cores in the SoC. The core and the isolation wrappers may also reduce test generation and test verification turnaround time. Test scheduling of the cores may be enabled to deal with issues of test power and defect isolation during debug effectively. Furthermore, hierarchical tests based on core wrapping may be enabled with the core and isolation wrappers.

The ability to embed (or integrate) wrapped cores into larger circuits generally has a variety of applications. For example, serialization/deserialization (e.g., SERDES) cores are commonly used across multiple designs under various usage scenarios. A SERDES core (or intellectual property) may be instantiated in a SoC at a top-level and/or inside other design blocks. For maximum reuse, the SERDES core may be designed once and used multiple times (e.g., 64 times) in a design and/or used in multiple designs. The SERDES core may be developed and delivered as a wrapped core to manage tester time and resources effectively using test scheduling. Use of the same core in a new core design where the new core is instantiated in another big design block generally results in a situation where both the SERDES core and the design block together may be wrapped cores.

In another example, a random access memory (e.g., RAM) core may be used as a stand-alone wrapped core or instantiated inside another design block. To maintain flow consistency, a single design flow may be performed where all RAM blocks are created as wrapped cores. The situation of a RAM block instantiated inside another design block that is also wrapped may be addressed by the logic and/or techniques.

In still another example, adoption of three-dimensional and two-and-a-half-dimensional packaging technologies generally results in logic partitioning approaches. The logic partitioning may result in a SoC divided into multiple dies (or chips or integrated circuits) that are later assembled into a single multi-dimensional package. The individual dies should be electronically isolated so that the dies may be tested stand-alone. To support the stand-alone testing, the dies may contain embedded design blocks that are wrapped resulting in situations having multiple embedded wrapped cores inside other wrapped cores or even multiple levels of nested wrapped cores.

The state controller circuits generally support design-for-test solutions to handle testing of the SoCs by implementing nested scan testing of hierarchical blocks. Sub-design blocks (e.g., wrapped cores) may be plugged into larger designs independent of the testing configurations of the larger designs. The nested scan testing may subsequently reduce test power consumption and improve verification times. The nested scan testing is generally suitable for where the design logic block (e.g., circuit 100g) is large and/or where the embedded logic block (e.g., circuit 102q) may be large. The nesting may provide isolated testing of the embedded logic blocks. Furthermore, the technique generally enables the same embedded logic blocks to be plugged into one or more designs with two or more testing configurations.

The functions performed by the diagrams of FIGS. 2-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a core embedded within said apparatus, wherein said core is (i) configured to perform a function and (ii) wrapped internally by a first scan chain before being embedded within said apparatus;
    one or more logic blocks (i) positioned external to said core and (ii) connected to one or more parallel interfaces of said first scan chain;
    a second scan chain configured to wrap both said logic blocks and said core, wherein said logic blocks are further connected to one or more parallel interfaces of said second scan chain; and
    a third scan chain positioned around an external boundary of said apparatus.

2. The apparatus according to claim 1, further comprising a test circuit configured to test said apparatus without testing said core and said logic blocks by controlling both said second scan chain and said third scan chain.

3. The apparatus according to claim 1, further comprising a controller circuit configured to adjust a plurality of states of said first scan chain, said second scan chain and said third scan chain during selective testing of said apparatus at a plurality of hierarchical levels.

4. The apparatus according to claim 1, further comprising a controller circuit configured to adjust a plurality of states of said first scan chain and said second scan chain to isolate said core from said apparatus during testing of said apparatus.

5. The apparatus according to claim 1, further comprising a test circuit configured to (i) test said core by controlling said second scan chain and (ii) test said logic blocks by controlling both said first scan chain and said second scan chain.

6. The apparatus according to claim 1, further comprising (i) one or more additional cores embedded within said apparatus and (ii) one or more additional scan chains each configured to wrap a respective one of said additional cores.

7. The apparatus according to claim 1, further comprising (i) an additional core embedded within said core and (ii) a fourth scan chain positioned within said core and configured to wrap said additional core.

8. The apparatus according to claim 1, further comprising an interface block configured to couple a tester external to said apparatus to at least one of said first scan chain and said second scan chain.

9. The apparatus according to claim 1, wherein said apparatus is implemented as one or more integrated circuits.

10. A method for designing a circuit with an embedded wrapped core, comprising the steps of:
   (A) embedding a core in said circuit, wherein said core is (i) configured to perform a function and (ii) wrapped internally by a first scan chain before being embedded within said circuit;
   (B) adding one or more logic blocks to said circuit, wherein said logic blocks are (i) positioned external to said core and (ii) connected to one or more parallel interfaces of said first scan chain;
   (C) adding a second scan chain to said circuit, wherein (i) said second scan chain is configured to wrap both said logic blocks and said core and (ii) said logic blocks are further connected to one or more parallel interfaces of said second scan chain; and
   (D) adding a third scan chain positioned around an external boundary of said circuit.

11. The method according to claim 10, further comprising the step of:
   adding a test block configured to test said circuit without testing said core and said logic blocks by controlling both said second scan chain and said third scan chain.

12. The method according to claim 10, further comprising the step of:
   adding a controller block configured to selectively merge said first scan chain in response to a current one of a plurality of test modes with at least one of (i) said second scan chain and (ii) a fourth scan chain internal to said circuit.

13. The method according to claim 10, further comprising the step of:
   adding a controller block configured to adjust a plurality of states of said first scan chain and said second scan chain to isolate said core from said circuit during testing of said circuit.

14. The method according to claim 10, further comprising the step of:
   adding a test block configured to (i) test said core by controlling said second scan chain and (ii) test said logic blocks by controlling both said first scan chain and said second scan chain.

15. The method according to claim 10, further comprising the steps of:
   embedding one or more additional cores within said circuit; and
   adding one or more additional scan chains each configured to wrap a respective one of said additional cores.

16. The method according to claim 10, further comprising the steps of:
   embedding an additional core within said core; and
   adding a fourth scan chain within said core, wherein said fourth scan chain is configured to wrap said additional core.

17. The method according to claim 10, further comprising the step of:
   adding an interface block configured to couple a tester external to said circuit to at least one of said first scan chain and said second scan chain.

18. An apparatus comprising:
   a core embedded within said apparatus, wherein said core is (i) configured to perform a function and (ii) wrapped internally by a first scan chain before being embedded within said apparatus;
   one or more logic blocks (i) positioned external to said core and (ii) connected to one or more parallel interfaces of said first scan chain;
   a second scan chain configured to wrap both said logic blocks and said core, wherein said logic blocks are further connected to one or more parallel interfaces of said second scan chain; and
   a test circuit configured to (i) test said core by controlling said second scan chain and (ii) test said logic blocks by controlling both said first scan chain and said second scan chain.

* * * * *